US012603969B2

(12) United States Patent
Baek

(10) Patent No.: US 12,603,969 B2
(45) Date of Patent: Apr. 14, 2026

(54) PARKING VIDEO RECORDING DEVICE, A TELEMATICS SERVER AND A METHOD FOR RECORDING A PARKING VIDEO

(71) Applicants: Hyundai Motor Company, Seoul (KR); Kia Corporation, Seoul (KR)

(72) Inventor: Joo Am Baek, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/748,325

(22) Filed: Jun. 20, 2024

(65) Prior Publication Data

US 2025/0063134 A1      Feb. 20, 2025

(30) Foreign Application Priority Data

Aug. 16, 2023      (KR) ........................ 10-2023-0106782

(51) Int. Cl.
| | |
|---|---|
| *H04N 5/77* | (2006.01) |
| *H04N 7/18* | (2006.01) |
| *G08G 1/04* | (2006.01) |

(52) U.S. Cl.
CPC .............. *H04N 5/77* (2013.01); *H04N 7/181* (2013.01); *H04N 7/188* (2013.01); *G08G 1/04* (2013.01)

(58) Field of Classification Search
None
See application file for complete search history.

(56) References Cited

U.S. PATENT DOCUMENTS

| | | | | |
|---|---|---|---|---|
| 9,141,582 | B1 * | 9/2015 | Brinkmann .............. | G07C 5/02 |
| 9,930,296 | B2 * | 3/2018 | Aoki ...................... | H04N 23/63 |
| 2017/0015260 | A1 * | 1/2017 | Mack ................. | H04N 21/4122 |
| 2020/0143682 | A1 * | 5/2020 | Chow .................... | G07B 15/02 |
| 2020/0177841 | A1 * | 6/2020 | Yin ........................ | H04N 7/181 |
| 2021/0280062 | A1 * | 9/2021 | Baird ...................... | H02S 20/10 |
| 2023/0049561 | A1 * | 2/2023 | Sun ......................... | G06V 20/58 |
| 2023/0260400 | A1 * | 8/2023 | Baird ..................... | G08G 1/017 |
| | | | | 340/932.2 |
| 2025/0063134 | A1 * | 2/2025 | Baek ...................... | H04N 7/181 |

* cited by examiner

*Primary Examiner* — Daniel T Tekle
(74) *Attorney, Agent, or Firm* — Fox Rothschild LLP

(57) ABSTRACT

According to an embodiment, a parking video recording system comprises an AVNT installed in a vehicle and a video recording device, wherein the AVNT is configured to receive an intent to use public CCTV from a user, transmit a location of the vehicle to an external server, and receive at least one public CCTV video within a predetermined distance from the location of the vehicle from the external server.

17 Claims, 5 Drawing Sheets

PARKING VIDEO RECORDING DEVICE, A TELEMATICS SERVER AND A METHOD FOR RECORDING A PARKING VIDEO

CROSS-REFERENCE TO RELATED APPLICATION

The present application claims under 35 U.S.C. § 119 (a) the benefit of Korean Patent Application No. 10-2023-0106782, filed on Aug. 16, 2023, the entire contents of which is incorporated herein by reference in its entirety.

BACKGROUND

Technical Field

The embodiments relate to a parking video recording device and a parking video recording method.

Background

A parking video recording device (e.g., a black box) has an issue of the usage of battery power of a vehicle being increased and an insufficient storage issue. Power usage and storage capacity of a parking video recording device may vary depending on a manufacturer and product specifications.

The power consumption of a parking video recording device may vary depending on the video quality setting, the video compression scheme, and the like. In general, video of length of about 6 hours to 20 hours may be stored with the parking mode.

Drivers with lesser occasions of driving the vehicle complain the issue of battery discharge due to the usage of battery power by the black box, and many drivers also express complaints regarding the issue of insufficient time duration of recording.

There is a need for reducing battery power consumption of the black box and further increasing the video storage capacity.

Summary

There is a need for a system or method capable of monitoring a video in a vehicle parking state by using a public closed circuit television (CCTV) accessible to anyone through communication with an external server and storing the video in the vehicle parking state to solve a problem of an increase in battery power usage and a shortage of storage capacity of a black box.

According to an embodiment, a parking video recording device comprises an audio video navigation telematics (AVNT) installed in a vehicle and a video recording device, wherein the AVNT is configured to receive an intent to use public CCTV from a user, transmit a location of the vehicle to an external server, and receive at least one public CCTV video within a predetermined distance from the location of the vehicle, from the external server.

The AVNT may be further configured to receive a selection from the user of one video among the at least one public CCTV video.

The AVNT may be further configured to transmit a first signal to the video recording device if the intent or the selection is not received, and the video recording device is configured to switch a parking recording mode to "ON" upon receiving the first signal.

The AVNT may be further configured to transmit a second signal to the video recording device and transmit a request for recording the one video to the external server if the selection is received, and the video recording device is configured to be switched "off" upon receiving the second signal.

The AVNT may be further configured to transmit a second signal to the video recording device and transmit the one video to a user's terminal if the selection is received, and the video recording device is configured to be switched off upon receiving the second signal.

The AVNT may transmit the second signal to the video recording device and transmit the selected video to the user's terminal if the selection is received, and the video recording device may be switched off upon receiving the second signal.

The AVNT may be further configured to transmit a third signal to the video recording device and transmit a request for continuously transmitting the selected one video to the external server if the selection is received, and the video recording device is configured to execute a parking video storage mode upon receiving the third signal.

The AVNT may be further configured to transmit a first signal to the video recording device if the intent or the at least one public CCTV video is not received, and the video recording device is configured to switch a parking recording mode to "ON" upon receiving the first signal.

According to an embodiment, a telematics server comprises a communication unit, and a video storage unit, wherein the communication unit is configured to receive a location of a vehicle from an AVNT of the vehicle, transmit the location of the vehicle to a public server, receive at least one public CCTV video around the location of the vehicle from the public server, and transmit the received public CCTV video to the AVNT.

The communication unit may be further configured to receive from the AVNT information related to one video selected by a user among the at least one public CCTV video.

The communication unit may be further configured to receive from the AVNT a request for storing the one video and store the one video in the video storage unit.

The communication unit may be further configured to receive from the AVNT a request for a transmission of the one video and transmit the one video to a user's terminal.

The communication unit may be further configured to receive a request for continuous transmission of the one video from the AVNT and transmit the one video to the AVNT.

According to an embodiment of the present disclosure, a parking video recording method, which is implemented by an AVNT and a video recording device, includes receiving, by the AVNT, an intent to use public CCTV from a user, transmitting, by the AVNT, a location of a vehicle to an external server, and receiving, by the AVNT, at least one public CCTV video within a predetermined distance from the location of the vehicle from the external server.

The method may further include receiving, by the AVNT, a selection of one video among the at least one public CCTV video.

The method may further include transmitting a first signal to the video recording device if the intent or the selection is not received, and switching a parking recording mode "ON" upon receiving the first signal.

The method may further include transmitting, by the AVNT, a second signal to the video recording device, transmitting, by the AVNT, a request for recording the one video to the external server if the selection is received, and switching the AVNT off upon receiving the second signal.

The method may further include transmitting a second signal to the video recording device in response to receiving the selection, transmitting the selected one video to a user's terminal, and switching the video recording device off upon receiving the second signal.

The method may further include transmitting a third signal to the video recording device if the selection is received, requesting to the external server, by the AVNT, for continuously transmitting the one video, and executing, by the video recording device, a parking video storage mode upon receiving the third signal.

The method may further include transmitting, by the AVNT, a first signal to the video recording device if the intent or the at least one public CCTV video is not received, and switching, by the video recording device, a parking recording mode to "ON" upon receiving the first signal.

An embodiment can significantly reduce the power usage according to video recording of a black box by using a video recorded in a public CCTV accessible by anyone for monitoring a vehicle parked by the user.

In addition, according to an embodiment, the user may select a device for storing a video of the surroundings of the vehicle recorded from the public CCTV, thereby significantly solving the issue of insufficient storage capacity of black box videos.

The effects of the present disclosure are not limited to the above-described effects, and may variously extend without deviating from the concept and scope of the present disclosure.

As discussed, the method and system suitably include use of a controller or processer.

In another embodiment, vehicles are provided that comprise an apparatus as disclosed herein.

DETAILED DESCRIPTIONS

Figure 1:
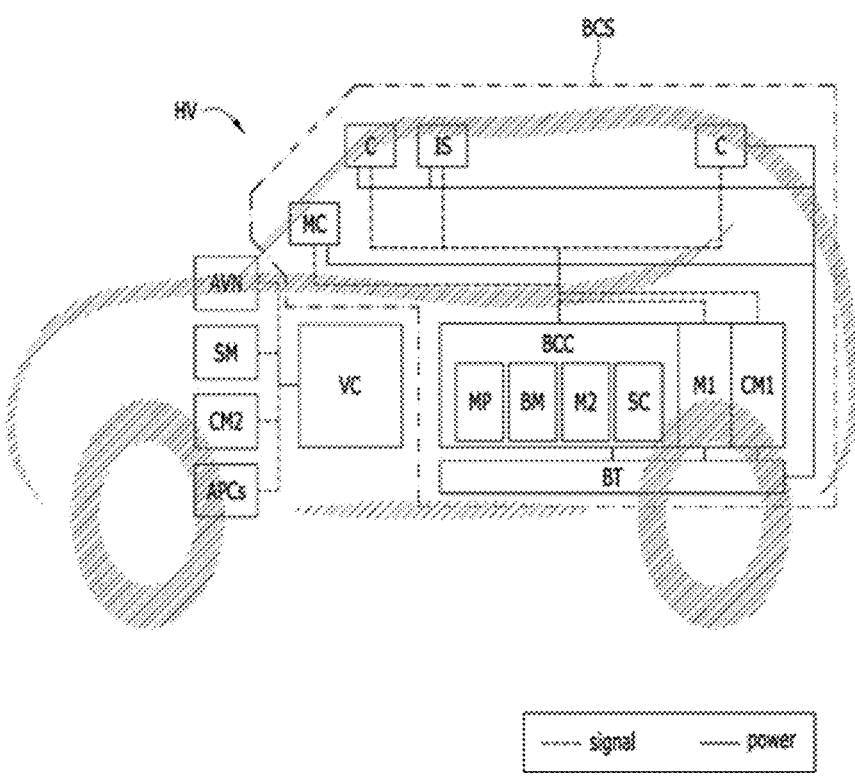
FIG. 1 is a block drawing conceptually showing elements of a parking video recording device according to an embodiment of the present disclosure.

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

The suffixes "module" and "unit" used herein are used only for name distinction between elements and should not be construed as being physiochemically divided or separated or assumed that they can be divided or separated.

Terms including ordinals such as "first," "second," and the like may be used to describe various elements, but the elements are not limited by the terms. The terms are used only for the purpose of distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

The terminology used herein is for the purpose of describing particular embodiments only and is not intended to be limiting of the disclosure. Singular expressions include plural expressions, unless the context clearly indicates otherwise. In the present application, it should be understood that the term "include" or "have" indicates that a feature, a number, a step, an operation, a component, a part, or a combination thereof described in the specification is present, but does not exclude the possibility of existence or addition of one or more other features, numbers, steps, operations, components, parts, or combinations thereof in advance.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, in order to control a function in charge, and one or more processors performing determination, calculation, determination, and the like necessary for controlling a function in charge.

Meanwhile, the processor may include a semiconductor integrated circuit and/or electronic elements that perform at least one or more of comparison, determination, calculation, and determination to achieve a programmed function. For example, the processor may be one of a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium may be electrically connected to the processor, and the processor may retrieve and record data from the recording medium. The recording medium and the processor may be integrated or may be physically separated.

Hereinafter, the embodiments of the present disclosure will be described in detail with reference to the accompanying drawings.

FIG. 1 is a block drawing conceptually showing elements of a parking video recording device according to an embodiment of the present disclosure.

Referring to FIG. 1, an embedded video recording device, so called a built-in camera system BCS, which is according to an embodiment of the present disclosure, is embedded in a host vehicle HV and includes camera modules C, a computer-readable storage medium M1, a first communication module CM1, a microphone MC, an impact sensor IS, an auxiliary power battery BT, and a built-in cam controller BCC.

Although the video recording device of the present embodiment is a built-in type, it is not limited thereto.

The camera module C includes a front camera and a rear camera in this embodiment, but it is not necessarily limited thereto. The front camera is installed to capture an image of the front area of the vehicle HV and to capture an image of the rear area of the vehicle HV.

For example, the front camera may be installed at a location near the room mirror in the vehicle (HV) cabin of the window shield, and the rear camera may be installed at the rear window of the vehicle (HV) cabin or the rear bumper. Also, the left and right cameras, respectively, may be installed on a side mirror, on a front or rear fender, or on a bumper.

For example, the front camera and the rear camera have the image quality of either an HD, an FHD, or a Quad HD.

It is evident that the front camera and the rear camera do not need to have the same image quality, and a camera of an Advanced Drive Assistance System (ADAS) of the host vehicle HV may be used.

Further, the camera has an aperture value of F2.0 or less, preferably F1.6 or less. If the aperture value decreases, more light is gathered so that recording may be made brighter. In addition, by applying image tuning technology to minimize the noise and the loss of light, clear recording is possible even in a dark environment.

The computer-readable recording medium (hereinafter, called "memory", in short) includes all types of storage devices in which data that can be read by a computer system is stored. For example, the memory includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 is 64 Gbyte or more Micro SD, and is of an external type. For example, real-time recording when traveling (hereinafter, simply referred to as an "driving real-time recording") may be performed for several hours, and a real-time recording when parking (hereinafter, simply referred to as a "parking real-time recording") may be performed for several tens of hours. In addition, event record according to impact detection may be performed up to several tens of times.

The user can easily check the contents stored in the memory in a desktop computer or the like by extracting the SD card.

The information of the state of the SD card can be checked through the connected car service, and the time of replacement according to the memory state can also be checked.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi. The Wi-Fi module of the present embodiment may include an Access Point (AP) function, and a user may easily and quickly access the built-in cam through, for example, a smartphone.

Due to Wi-Fi, the user can easily and quickly access the built-in cam through, for example, a smartphone.

The microphone MC supports voice recording. When the driving images of the vehicle HV is recorded, not only the images are recorded but also the voices are recorded as well.

The impact sensor IS senses an external impact and may be a one-axis or a three-axis acceleration sensor.

The impact sensor IS may be prepared as the built-in cam system BCS, but it is evident that it may be used as an acceleration sensor installed in the host vehicle HV.

The signals of the impact sensor IS may be a starting points for a later described event recording, and the degree of impact serving as a references thereof can be set by the user.

For example, the user may select an impact detection sensitivity that is a criterion for recording an event when setting the built-in cam system BCS through a display screen (i.e., a later described AVNT screen) in the vehicle HV.

For example, the impact sensitivity may be classified into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12V battery) installed in the vehicle HV.

Although the system is operated by receiving power of the vehicle HV battery during parking as well as during driving, there may be an over-discharge problem of the vehicle HV battery, and thus, the present embodiment includes the power auxiliary battery BT.

In the present embodiment, the built-in cam system BCS receives power from any one of the battery of the vehicle HV, of the alternator in the case of the internal combustion engine vehicle, and of the lower DC/DC converter in the case of the electric vehicle, while receiving power from the power auxiliary battery BT during parking. However, it is not limited thereto.

The power auxiliary battery BT is charged and discharged depending on an operating environment of the vehicle HV and supplies optimal power for recording and OTA software update during parking.

The charging of the power auxiliary battery BT is performed by a vehicle HV battery (a low voltage battery or a high voltage battery of an electric vehicle), or performed by an alternator in the case of an internal combustion engine vehicle HV.

The built-in cam controller BCC is a superior controller that controls other components of the built-in cam system BCS and exchanges signals with the controller VC of the host vehicle HV and/or the head unit HU, the sensor module SM, the component controllers APCs, Audio Video Navigation AVNT, etc. For these signal exchanges, communication may be facilitated via a local interconnect network LIN or controller area network CAN.

Here, the sensor module SM includes one or more of a speed sensor, of an acceleration sensor, of a vehicle location sensor (e.g., a GPS receiver), of a steering angle sensor, of a yaw rate sensor, of a pitch sensor, and of a roll sensor, and the component controllers APCs may include one or more of a turn signal controller, of a turn signal controller, of a wiper controller, of an ADAS controller, and of an airbag controller.

The built-in cam controller (BCC) controls other components to perform constant recording while driving, constant recording while parking, event recording for recording according to the impact signal of the impact sensor, etc.

When recording, driving information of the vehicle HV is recorded as well.

Here, the vehicle (HV) driving information includes time, vehicle speed, gear location, turn signal information, impact detection sensitivity (one corresponding to the above-described five levels), global positioning system (GPS) location information, etc.

The vehicle driving information may be received from the vehicle controller VC, but it is that it may also be directly received from a corresponding module or component of the vehicle HV. For example, vehicle speed may be directly received from a speed sensor of the vehicle HV, a turn signal information (or turn signal information from a turn signal controller) may be directly received from a turn signal controller, or GPS location information may be received from a AVNT or a GPS receiver.

As described above, the event recording is performed when the event occurrence is detected while parking depending on the impact detection sensitivity set by the user.

In the event recording, recording is performed from a set time before the event occurrence time to a set time after the event occurrence time, and the set time may be selected by the user.

The AVNT is connected to the built-in cam controller BCC directly or through the vehicle controller VC, and the AVNT screen may function as a user interface for receiving various set parameters of the built-in cam system BCS from the user.

The built-in cam controller BCC transmits recorded content to an external server according to a set period, a user selection, or an event (e.g., a degree of impact detection) from a user setting.

The built-in cam controller BCC includes a memory M2 and a processor MP to perform its functions.

In an embodiment, the processor MP may include a semiconductor integrated circuit and/or electronic devices that perform at least one or more of comparison, determination, calculation, and determination to achieve a programmed function. For example, the processor MP may be a computer, a microprocessor MC, a CPU, an ASIC, and electronic circuits (circuitry, logic circuits), or a combination thereof.

The memory M2 may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The memory M2 may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC.

When power is suddenly cut off due to impact, damage, or the like, power charged in the super capacitor SC is used to complete video storage that is in progress.

For example, the super capacitor SC have a charging capacity capable of maintaining the power of the built-in cam controller BCC from several to tens of seconds.

Figure 2:
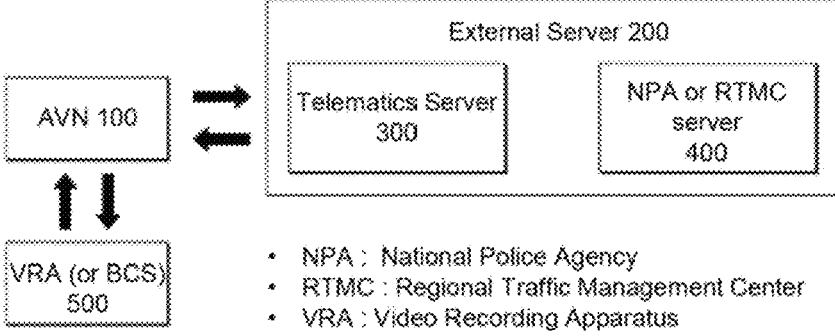
FIG. 2 is a block drawing of systems capable of performing the parking video recording device and method of the embodiment.

FIG. 2 is a block drawing for the parking video recording device and the method of the embodiment.

Referring to FIG. 2, the parking video recording method according to the embodiment may be performed by the vehicle AVNT 100, the external server 200, or the video recording device (or the built-in cam system BCS) 500. The vehicle AVNT 100 performs communication with the external server 200. In addition, the vehicle AVNT 100 transmits a signal for controlling the video recording device 500 based on data transmitted and received through communication with the external server 200 and the current state of the video recording device 500.

The vehicle AVNT 100 presents an interface to a user, performs communication with the external server 200 based on data selected and input from the user, and transmits a signal for controlling the video recording device 500 based on data selected and input from the user.

For example, the vehicle AVNT 100 determines the current location of the vehicle using the GPS and transmits the determined location information of the vehicle to the external server 200.

The external server 200 may include a telematics server 300 and/or a National Police Agency server or a regional traffic management center server 400.

The telematics server 300 transmits and receives data about the state of the vehicle through communication with the vehicle AVNT 100, and may transmit and receive data for controlling the video recording device 500.

The telematics server 300 may communicate with the National Police Agency server or the local traffic management center server 400, i.e., servers providing public CCTV videos.

For example, the telematics server 300 communicates with the user's terminal through an application provided by a company that sells or manufactures the vehicle of the embodiment to help the user manage the vehicle.

The user's terminal may be, for example, a smartphone, a device such as a PDA, a notebook computer, a tablet PC, or the like, or a wearable device such as a watch.

For example, the telematics server 300 may transmit the vehicle location information received through the vehicle AVNT 100 to the National Police Agency server or the regional traffic management center server 400.

The National Police Agency server or the regional traffic management center server 400, also referred to as a public server, may search for at least one public CCTV video within a predetermined distance from the current vehicle based on the vehicle location information received from the telematics server 300 or the vehicle AVNT 100.

The National Police Agency server or the regional traffic management center server 400 are few examples, and public servers included in the external server 200 are not limited to a specific server as long as they are servers capable of providing a public CCTV video in order to perform the parking video recording method according to the embodiment. For example, the National Police Agency server or the regional traffic management center server 400 may be replaced with a National Traffic Information Center server.

For example, the public CCTV video may be acquired from a camera installed in a regional traffic control center to enforce illegal parking control, or may be acquired from a camera installed by the National Police Agency to prevent crime.

The public CCTV video may be acquired from open API (Application Programming Interface) information provided by, for example, the National Transport Information Center as well as the National Police Agency server or the regional traffic management center server 400.

If a public CCTV video within a predetermined distance from the current location of the vehicle is not searched for instance, the National Police Agency server or the regional traffic management center server 400 may transmit a null signal to the telematics server 300 or the vehicle AVNT 100.

For example, the predetermined distance may mean a radius of 500 m based on the current location information of the vehicle. The predetermined distance is sufficient as long as the currently parked vehicle can be captured through the public CCTV and is not limited to a specific distance.

The video recording device 500, for example, may be a built-in cam embedded in the vehicle, but all devices that capture or store parking videos of vehicles and are controlled through an external device may be the video recording device 500 of the embodiment.

Figure 3:
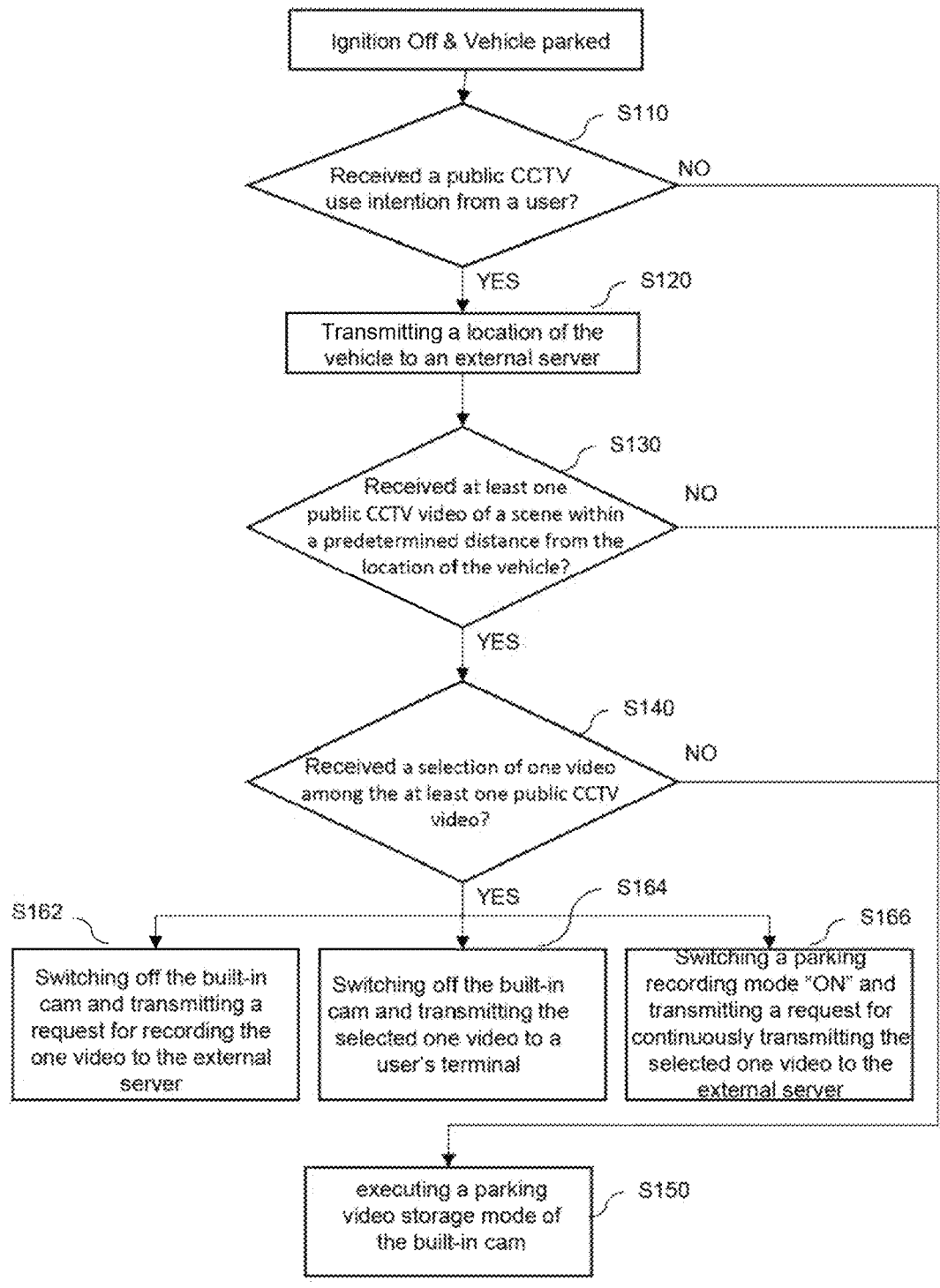
FIG. 3 is a flowchart illustrating a parking video recording method according to an embodiment in which an AVNT is used as the main subject.

FIG. 3 is a flowchart for describing a parking video recording method according to an embodiment in which an AVNT is used as the main subject.

Referring to FIG. 3, the parking video recording method according to the embodiment is performed by a parking video recording device including the vehicle AVNT 100 and the video recording device 500 as elements.

The parking video recording method according to the embodiment may start from an operation (S110) of inquiring whether the vehicle AVNT 100 has intent to monitor a parking state of the vehicle by searching and using a public CCTV video to the user when the user turns off the ignition of the vehicle and parks the vehicle, that is, determining whether the vehicle AVNT 100 receives an intent to use the public CCTV from the user.

The user who parks the vehicle may use a public CCTV video to monitor the user vehicle in a parked state or may monitor the vehicle using a video captured by the video recording device 500 mounted in the vehicle. That is, when the vehicle AVNT 100 receives the intent to use the public CCTV from the user in S110, the process may proceed to the following S120, and when the vehicle AVNT 100 does not receive the intent to use the public CCTV from the user, the process may proceed to a parking recording execution S150 using the video recording device 500.

The parking recording performing S150 using the video recording device 500 is performed by the vehicle AVNT 100 transmitting a first signal to the video recording device 500.

The video recording device 500 switches the parking recording mode to "ON" upon receiving the first signal.

S120, in which the vehicle AVNT 100 transmits the location of the vehicle to the external server 200 for instance, is defined when the vehicle AVNT 100 recognizes the current location of the vehicle using a GPS and transmits the location information of the vehicle to the external server 200.

The external server 200 determines whether there is a public CCTV video within the predetermined distance from the current location of the vehicle by receiving the location information of the vehicle from the vehicle AVNT 100 transmits at least one public CCTV video to the vehicle AVNT 100.

A public CCTV video capable of capturing a current parking location of the vehicle may not exist or may exist in plural. The external server 200 may transmit a null signal to the vehicle AVNT 100 if no public CCTV video is available to capture the parking location of the vehicle. Alternatively, if there are multiple public CCTV videos available, the server may transmit at least one of these videos to the vehicle AVNT 100. S130 that determines whether the vehicle AVNT 100 has received at least one public CCTV video existing within the predetermined distance from the vehicle location from the external server 200 is determining whether to proceed to S140 or S150 according to whether the vehicle AVNT 100 has received at least one public CCTV video from the external server 200.

If the vehicle AVNT 100 has not received at least one public CCTV video, i.e., receiving a null signal from the external server 200, the first signal may be transmitted to the video recording device 500.

S140 of determining, by the vehicle AVNT 100, whether any one of the public CCTV videos is selected by the user is presenting, by the vehicle AVNT 100, at least one public CCTV video received from the external server 200 to the user, and receiving any one of at least one public CCTV video selected by the user.

The vehicle AVNT 100 may receive a plurality of public CCTV videos (i.e., four videos) within a predetermined distance from the vehicle from the external server 200, and present the plurality of received videos to the user through an interface. The interface that the AVNT presents to the user will be described later in FIG. 5.

The user may receive a plurality of public CCTV videos around the user vehicle through the external server 200 and the vehicle AVNT 100. However, it is possible that none of the received videos are suitable for monitoring the parking state of the user vehicle. When it is determined that there is no video suitable for monitoring the parking state of the vehicle among the plurality of CCTV videos, the user may transmit a command to the vehicle AVNT 100, instructing it not to use the public CCTV video.

The vehicle AVNT 100 transmits the first signal to the video recording device 500 when receiving a command not to use the public CCTV video from the user, and the video recording device 500 switches the parking recording mode to "ON" in response to receiving the first signal.

The user may select one video most suitable for monitoring or capturing a parking state of the user vehicle among the plurality of received public CCTV videos. The user monitors a parking state of his or her vehicle using the vehicle AVNT 100 through the interface and select a public CCTV video to be stored.

The vehicle AVNT 100 proceeds to S162, S164, or S166 when one of the public CCTV videos presented through the interface is selected by the user and proceeds to S150 when one of the public CCTV videos is not selected by the user. S162 is referred to as the first mode, S164 is referred to as the second mode, and S166 is referred to as the third mode.

The vehicle AVNT 100 receives a selection of one of the public CCTV videos from the user, and may proceed to receive a selection of which one of the first mode, the second mode, or the third mode is to be performed through the interface.

The vehicle AVNT 100 may transmit the second signal for turning off the video recording device 500 when the first mode or the second mode is selected by the user.

In S162, the vehicle AVNT 100 determines the video recording device 500 to be turned off and transmits a request for recording one CCTV video selected by the user to the external server 200.

The external server 200, i.e., the telematics server 300, the National Police Agency server, or the local traffic management center server 400, receives the video selected by the user from the vehicle AVNT device 100, i.e., one video selected by the user, and record the selected video. Thereafter, the external server 200 transmits the recorded video to the vehicle AVNT 100 or the user's terminal if the user requests.

That is, in S162, the video recording device 500 does not capture the surroundings of the vehicle and does not store the video, and the user may store the public CCTV video and the video of the vehicle parked state by using the external server 200, thereby reducing the amount of the battery used by the video recording device 500 and saving the storage capacity of the video recording device 500.

In S164, the vehicle AVNT 100 transmits the second signal to the video recording device 500 and transmits one video selected by the user to the user's terminal.

In S164, the user receives one video selected by the user from the vehicle AVNT 100 through the user's terminal and monitors public CCTV videos around the vehicle when the user requests, and if so, stores surrounding videos using the memory of the user's terminal.

In addition, in S164, the vehicle AVNT 100 may request the external server 200 to directly transmit the one public CCTV video selected by the user to the user's terminal, and the external server 200 may transmit the one public CCTV video selected by the user to the user's terminal.

That is, in S164, the video recording device 500 does not capture the surroundings of the vehicle and does not store a video, and the user monitors the vehicle parking state using the public CCTV video, the user's terminal, and the external server 200, and if required, may store the video in the user's terminal, thereby reducing the amount of use of the vehicle battery of the video recording device 500 and saving the storage capacity of the video recording device 500.

When the third mode is selected by the user, the vehicle AVNT 100 may transmit the third signal for controlling the video recording device 500 to the parking video storage mode, i.e., the mode for storing the received video, to the video recording device 500.

In S166, the vehicle AVNT 100 controls the video recording device 500 to store the received video without filming the surroundings of the vehicle.

When the third mode is selected, the vehicle AVNT 100 requests the external server 200 to continuously transmit one public CCTV video selected by the user, receive one public CCTV video, and store the received one public CCTV video in the memory of the video recording device 500.

That is, in S166, the user may store the surrounding video of the parked vehicle by using the public CCTV video, the memory of the video recording device 500, and the external server 200 without capturing the surroundings of the vehicle, and may play the vehicle parking video through the vehicle AVNT 100 if desired, thereby reducing the amount of battery used by the video recording device 500.

Figure 4:
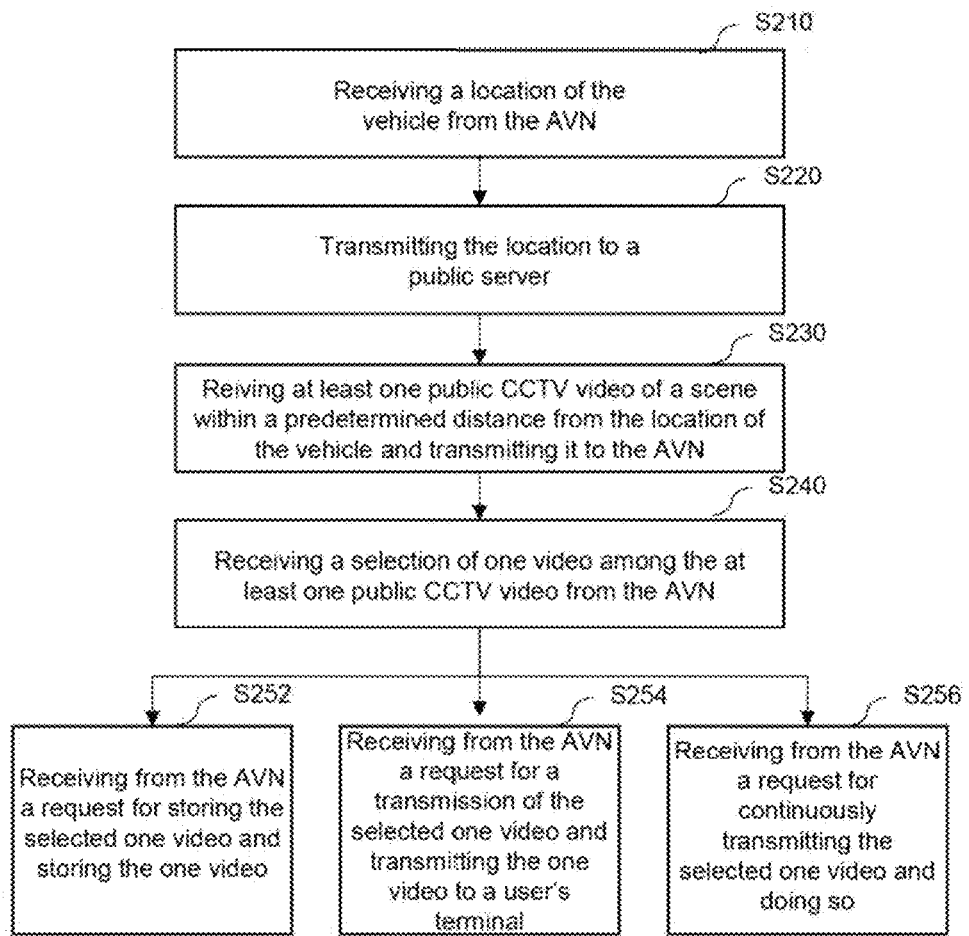
FIG. 4 is a flowchart illustrating a parking video recording method of an embodiment in which a server is the main subject.

FIG. 4 is a flowchart illustrating a parking video recording method of an embodiment in which a server is a main subject.

Referring to FIG. 4, the telematics server 300 included in the external server 200 performs the parking video recording method according to the embodiment by including a S210 of receiving the location of the vehicle from the vehicle AVNT 100, a S220 of transmitting the received location of the vehicle to a public server, S230 of receiving at least one public CCTV video around the location of the vehicle from the public server and transmitting the received public CCTV video to the vehicle AVNT 100, and S240 of receiving video information selected from at least one public video from the vehicle AVNT 100 by the user.

Thereafter, the telematics server 300 receives information about which mode the user has selected among the first mode, the second mode, or the third mode from the vehicle AVNT device 100, and proceeds to S252, S254, or S256.

In S252, the telematics server 300 receives a request for storing one public CCTV video selected by the user from the vehicle AVNT 100 and stores the public CCTV video selected by the user in the video storage unit of the telematics server 300.

In S254, the telematics server 300 receives a request for transmission of one public CCTV video selected by the user from the vehicle AVNT 100 and transmits the received request to the user's terminal.

In S256, the telematics server 300 receives a continuous transmission request requesting continuous transmission of one public CCTV video selected by the user from the vehicle AVNT 100, and continuously transmits the one public CCTV video selected by the user to the vehicle AVNT 100.

FIG. 5 illustrates an AVNT interface according to an embodiment.

Figure 5A:
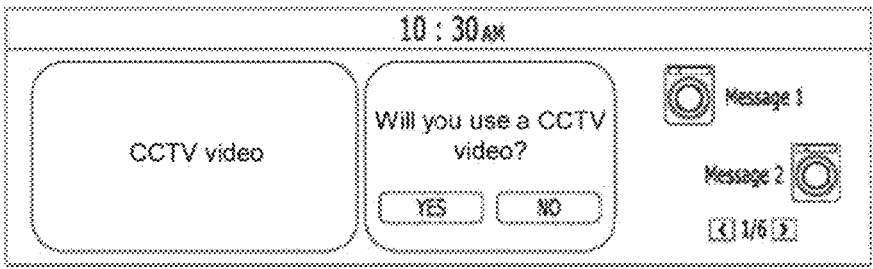
FIG. 5A illustrates an AVNT interface asking if a user wants to use public CCTV or the car's video recording device to monitor the parked vehicle.

Referring to FIG. 5A, the vehicle AVNT 100 presents an interface inquiring whether to monitor surroundings of a parked vehicle using a public CCTV video when the user parks the vehicle and turns off the engine. When the vehicle AVNT 100 receives an intent to not use the public CCTV video from the user, it turns on the real-time parking recording function of the video recording device 500 and transmit the first signal for controlling to record the surroundings of the parked vehicle according to the existing parking setting of the video recording device 500 to the video recording device 500. The vehicle AVNT 100 transmits the location information of the vehicle to the external server 200 using the GPS when receiving an intent to use the public CCTV video from the user.

Figure 5B:
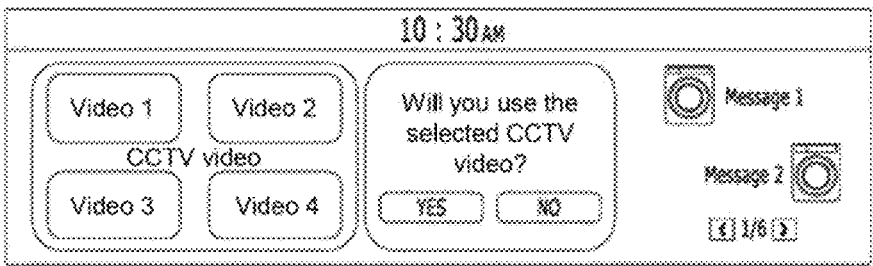
FIG. 5B illustrates an AVNT displaying multiple public CCTV videos and allowing a user to choose one or default to the car's video recording device.

Referring to FIG. 5B, the vehicle AVNT 100 receives at least one public CCTV video (e.g., videos 1, 2, 3, and 4) from the external server 200 and presents the received video to the user. The vehicle AVNT 100 may transmit the first signal to the video recording device 500 when the user does not select any one of the plurality of public CCTV videos.

The vehicle AVNT 100 divides the received plurality of public CCTV videos (e.g., videos 1, 2, 3, and 4) and presents them to the user, and receive a selection of one of the divided public CCTV videos.

That is, the case in which the vehicle AVNT 100 does not receive any one of the plurality of public CCTV videos from the user in the interface of FIG. 5B means the case in which it is determined that there is no public CCTV video suitable for monitoring the vehicle parking state of the user, that is, the case in which the vehicle of the user is not exposed to any one of the plurality of public CCTV videos received by the vehicle AVNT 100. The vehicle AVNT 100 may receive a selection of any one of the plurality of public CCTV videos, and when the user selects the first mode, the vehicle AVNT 100 may proceed to S162 of transmitting a signal for turning off the video recording device 500 to the video recording device 500 and transmitting a request for recording one selected CCTV video from the user to the external server 200. The vehicle AVNT 100 proceeds to S164 in which the vehicle AVNT 100 transmits the signal for turning off the video recording device 500 to the video recording device 500 when any one of the plurality of public CCTV videos is selected and the user selects the second mode. When the vehicle AVNT 100 receives a selection of any one of the plurality of public CCTV videos and the user selects the third mode, the vehicle AVNT 100 transmits the signal for controlling the video recording device 500 to store the received video without capturing the surroundings of the vehicle to the video recording device 500, and may proceed to S166 of requesting the external server 200 to continuously transmit the public CCTV video selected by the user.

Figure 5C:
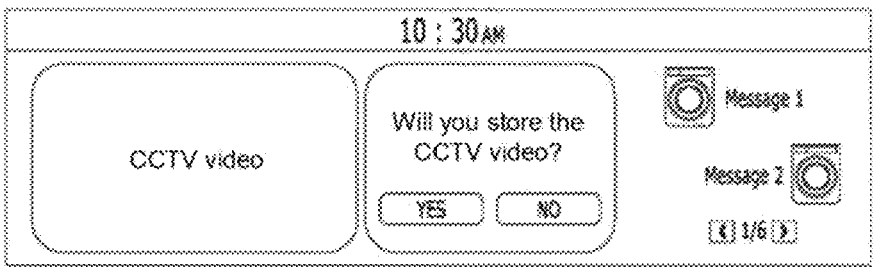
FIG. 5C illustrates an AVNT asking if the user wants to store the selected public CCTV video in the car's video recording device.

Referring to FIG. 5C, when the user selects the third mode, the vehicle AVNT 100 presents one public CCTV video selected by the user and presents an interface inquiring whether to store one public CCTV video selected by the user in the memory of the video recording device 500.

Message 1 and Message 2 of FIG. 5 are messages displayed on the vehicle AVNT 100 so that the user can efficiently control the vehicle AVNT 100, and for example, message 1 may be "You may move to the home screen by pressing the button for a long time", and message 2 may be "You can turn on and off the breathing screen by pressing the MENU button for a long time on the map screen".

The above description of the present disclosure is for illustrative purposes, and those of ordinary skill in the art to which the present disclosure pertains will appreciate that the present disclosure may be modified into other specific forms without changing the technical idea or essential feature of the present disclosure. Therefore, it should be understood that the embodiments described above are examples and not restrictive in all aspects.

The scope of the present disclosure is expressed by the following claims rather than the above-described detailed description, and it should be interpreted that the meaning and scope of the claims and all changes or modifications derived from the equal concept thereof are included in the scope of the present disclosure.

What is claimed is:

1. A parking video recording system comprising:
an audio video navigation telematics (AVNT) installed in a vehicle; and
a video recording device,
wherein the AVNT is configured to:
receive an intent to use public closed circuit television (CCTV) from a user,
transmit a location of the vehicle to an external server,
receive at least one public CCTV video within a predetermined distance from the location of the vehicle from the external server,
receive a selection from the user of one video among the at least one public CCTV video, and
transmit a control signal to the video recording device to switch between an ON state and an OFF state.

2. The system according to claim 1, wherein the AVNT is further configured to transmit a first signal to the video recording device if the intent or the selection is not received, and the video recording device is configured to switch a parking recording mode to "ON" upon receiving the first signal.

3. The system according to claim 1, wherein the AVNT is further configured to transmit a second signal to the video recording device and transmit a request for recording the one video to the external server if the selection is received, and the video recording device is configured to be switched "off" upon receiving the second signal.

4. The system according to claim 1, wherein the AVNT is further configured to transmit a second signal to the video recording device and transmit the one video to a user's terminal if the selection is received, and the video recording device is configured to be switched off upon receiving the second signal.

5. The system according to claim 1, wherein the AVNT is further configured to transmit a third signal to the video recording device and transmit a request for continuously transmitting the one video to the external server if the selection is received, and the video recording device is configured to execute a parking video storage mode upon receiving the third signal.

6. The system according to claim 1, wherein the AVNT is further configured to transmit a first signal to the video recording device if the intent or the at least one public CCTV video is not received, and the video recording device is configured to switch a parking recording mode to "ON" upon receiving the first signal.

7. A vehicle comprising the system according to claim 1.

8. A telematics server comprising:

a communication unit; and a video storage unit, wherein the communication unit is configured to:

receive a location of a vehicle from an audio video navigation telematics (AVNT) of the vehicle, transmit the location of the vehicle to a public server, receive at least one public closed circuit television (CCTV) video around the location of the vehicle from the public server, and transmit the received public CCTV video to the AVNT, receive from the AVNT information related to one video selected by a user among the at least one public CCTV video, and transmit a control signal to a video recording device to switch between an ON state and an OFF state.

9. The telematics server of claim 8, wherein the communication unit is further configured to receive from the AVNT a request for storing the one video and store the one video in the video storage unit.

10. The telematics server of claim 8, wherein the communication unit is further configured to receive from the AVNT a request for a transmission of the one video and transmit the one video to a user's terminal.

11. The telematics server according to claim 8, wherein the communication unit is further configured to receive a request for continuous transmission of the one video from the AVNT and transmit the one video to the AVNT.

12. A method for recording a parking video by an audio video navigation telematics (AVNT) and a video recording device, the method comprising:

receiving, by the AVNT, an intent to use public closed circuit television (CCTV) from a user;

transmitting, by the AVNT, a location of a vehicle to an external server;

receiving, by the AVNT, at least one public CCTV video within a predetermined distance from the location of the vehicle, from the external server;

receiving, by the AVNT, a selection from the user of one video among the at least one public CCTV video, and transmitting, by the AVNT, a control signal to the video recording device to switch between an ON state and an OFF state.

13. The method according to claim 12, further comprising transmitting a first signal to the video recording device if the intent or the selection is not received, and switching a parking recording mode "ON" upon receiving the first signal.

14. The method according to claim 12, further comprising transmitting, by the AVNT, a second signal to the video recording device and transmitting, by the AVNT, a request for recording the one video to the external server if the selection is received, and switching the AVNT off upon receiving the second signal.

15. The method according to claim 12, further comprising transmitting a second signal to the video recording device and transmitting the one video to a user's terminal if the selection is received, and switching the video recording device off according to the second signal.

16. The method according to claim 12, further comprising transmitting a third signal to the video recording device if the selection is received, requesting to the external server, by the AVNT, for continuously transmitting the one video, and executing, by the video recording device, a parking video storage mode upon receiving the third signal.

17. The method according to claim 12, further comprising transmitting, by the AVNT, a first signal to the video recording device if the intent or the at least one public CCTV video is not received, and switching, by the video recording device, a parking recording mode to "ON" upon receiving the first signal.

* * * * *